US012791133B2

(12) United States Patent
Zeng et al.

(10) Patent No.: US 12,791,133 B2
(45) Date of Patent: Nov. 10, 2026

(54) PIPE CONNECTION ASSEMBLY AND INFLATABLE PRODUCT

(71) Applicant: BESTWAY INFLATABLES & MATERIAL CORP., Shanghai (CN)

(72) Inventors: Xianglin Zeng, Shanghai (CN); Jiang Xu, Shanghai (CN); Qingshui Song, Shanghai (CN)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 0 days.

(21) Appl. No.: 18/230,330

(22) Filed: Aug. 4, 2023

(65) Prior Publication Data

US 2024/0309979 A1 Sep. 19, 2024

(30) Foreign Application Priority Data

Mar. 14, 2023 (CN) ........................ 202320509835.4

(51) Int. Cl.
*F16L 33/035* (2006.01)
*F16L 33/22* (2006.01)
*E04H 4/00* (2006.01)

(52) U.S. Cl.
CPC ........... *F16L 33/035* (2013.01); *F16L 33/224* (2013.01); *E04H 4/0025* (2013.01)

(58) Field of Classification Search
CPC ........ F16L 33/224; F16L 33/035; F16L 33/03; F16L 33/223; F16L 33/228
USPC ................ 285/242, 244, 245, 246, 247, 254
See application file for complete search history.

(56) References Cited

U.S. PATENT DOCUMENTS 2,433,602 A * 12/1947 Coss ....................... F16L 33/02 285/242
2,688,498 A * 9/1954 Wilson .................... F16L 33/22 285/37
4,244,088 A 1/1981 Sauer
4,313,629 A * 2/1982 Winterhalter ....... F16L 33/2071 285/256
4,451,070 A * 5/1984 Sauer ...................... F16L 33/22 285/423

(Continued)

FOREIGN PATENT DOCUMENTS

JP S5994688 U 6/1984

OTHER PUBLICATIONS

Extended European Search Report dated Feb. 1, 2024 (Feb. 1, 2024), 11 pages, issued on related European Patent Application 23194479.4 by the European Patent Office.

*Primary Examiner* — David Bochna
(74) *Attorney, Agent, or Firm* — Dickinson Wright PLLC

(57) ABSTRACT

A pipe connection assembly is provided including a first pipe having a first end and a second end; a second pipe including an insertion end extending in a lengthwise direction of the second pipe; and a fixing member. The second pipe includes a first protrusion protruding radially outward from the insertion end, and the insertion end is inserted into the second end of the first pipe such that the first protrusion presses radially outward on the first pipe thereby creating a second protrusion protruding radially outward from a pipe wall of the first pipe. The fixing member is sleeved around an outer periphery of the first pipe and is disposed in the lengthwise direction between the second protrusion and the second end of the first pipe.

20 Claims, 10 Drawing Sheets

(56) References Cited

U.S. PATENT DOCUMENTS

| | | | | | |
|---|---|---|---|---|---|
| 4,537,183 | A * | 8/1985 | Fogarty | A61F 2/26 | 128/DIG. 25 |
| 4,635,966 | A * | 1/1987 | Hermann | F28F 9/0246 | 285/244 |
| 4,790,569 | A * | 12/1988 | Chaffee | F16L 33/225 | 285/40 |
| 4,969,668 | A | 11/1990 | Sauer | | |
| 5,261,706 | A * | 11/1993 | Bartholomew | F16L 33/225 | 285/242 |
| 5,620,209 | A | 4/1997 | Sauer | | |
| 6,000,729 | A * | 12/1999 | Williamson | F16L 33/225 | 285/242 |
| 6,543,138 | B1 * | 4/2003 | Berry | A61M 39/1011 | 29/451 |
| 6,557,788 | B1 * | 5/2003 | Huang | F16L 33/223 | 239/589 |
| 6,641,177 | B1 | 11/2003 | Pinciaro | | |
| 7,455,324 | B2 * | 11/2008 | Inoue | F16L 37/088 | 285/259 |
| 7,581,762 | B1 * | 9/2009 | Werner | F16L 33/22 | 285/254 |
| 8,297,661 | B2 * | 10/2012 | Proulx | A61M 39/1011 | 29/508 |
| 2005/0012332 | A1 * | 1/2005 | Werth | A61M 39/12 | 285/322 |
| 2005/0081935 | A1 * | 4/2005 | Shimizu | F16L 37/0885 | 138/109 |
| 2011/0089683 | A1 | 4/2011 | Maunder | | |
| 2019/0032351 | A1 | 1/2019 | Huang et al. | | |
| 2020/0182387 | A1 | 6/2020 | Morrissey | | |

* cited by examiner

PIPE CONNECTION ASSEMBLY AND INFLATABLE PRODUCT

CROSS-REFERENCE TO RELATED APPLICATION

This application claims priority from Chinese Application CN 202320509835.4, filed Mar. 14, 2023 in China, the disclosure of which is incorporated herein by reference in its entirety.

BACKGROUND

1. Field

Example embodiments relate to pipe connection fittings, and in particular to a pipe connection assembly and an inflatable product.

2. Description of Related Art

There is an increasing desire for various portable apparatuses for use in a variety of places. For example, an apparatus used indoors may be moved to the outdoor for use. As a typical example, inflatable products are lightweight and easy to package and store, and are widely used. An inflatable product may be provided with a hose for fluid delivery. For example, in an inflatable SPA pool, water or air is delivered to a hose of the inflatable SPA pool by means of a pump system, and is then sprayed into the water in the pool to achieve a massage effect. During the transportation, use, or folding of the inflatable product, when the hose is accidentally pulled, the hose may be easily pulled off of a joint. Such a hose may be clamped between a rigid rubber-coated joint and a nut so as to achieve a fixed connection between the hose and the joint, which is complex in structure and high in cost.

Referring to FIG. 1, taking a SPA pool 1000 as an example, water is delivered into a hose 100 by means of a water pump (not shown), and is then sprayed from nozzles 200 on an inner wall of the pool 1000 so as to achieve a massage effect. During this process, the hose 100 is connected to a joint to deliver water to the SPA pool 1000. However, after the hose 100 is connected to the joint, the problems such as loose connection or even detachment may easily occur during long-term use.

SUMMARY

Example embodiments may address at least the above problems and/or disadvantages and other disadvantages not described above. Also, example embodiments are not required to overcome the disadvantages described above, and may not overcome any of the problems described above.

According to an aspect of an example embodiment, a pipe connection assembly, comprises: a first pipe comprising a first end and a second end; a second pipe comprising an insertion end, extending in a lengthwise direction of the second pipe, and a first protrusion protruding radially outward from the insertion end, wherein the insertion end is inserted into the second end of the first pipe such that the first protrusion presses radially outward on the first pipe thereby creating a second protrusion protruding radially outward from a pipe wall of the first pipe; and a fixing member sleeved around an outer periphery of the first pipe and disposed in the lengthwise direction between the second protrusion and the second end of the first pipe.

The fixing member may comprise: a first end abutting against the second protrusion; a second end; and a plurality of circumferentially-spaced claws, each of the claws protruding from the second end and configured to engage with an outer periphery of the first pipe.

The fixing member may comprise: a first fixing component; and a second fixing component detachably connected to the first fixing component; wherein the first fixing component, the second fixing component, and the first protrusion together define a holding space, wherein the second protrusion is disposed in the holding space.

The first fixing component may comprise a first threaded connector comprising an internal thread; the second fixing component may comprise a second threaded connector comprising an external thread; and the first threaded connector and the second threaded connector may be connected to each other by means the internal thread and the external thread.

An inner wall of the first fixing component may comprise a first stop portion; an inner wall of the second fixing component may comprise a second stop portion; and the holding space may be defined by the first stop portion, the second stop portion, and the first protrusion together.

The first stop portion may comprise a first slope portion facing the second protrusion; the second stop portion may comprise a second slope portion facing the second protrusion; and the holding space may be defined by the first slope portion, the second slope portion, and the first protrusion together.

The inner wall of the first fixing component may comprise a pressing end, the first stop portion may be disposed between the pressing end and the second stop portion, and the pressing end may be pressed against the outer periphery of the first pipe.

The fixing member may comprise a hoop member that is sleeved around the outer periphery of the first pipe.

The pipe connection may further comprise a protective sleeve wrapped around an outer periphery of the hoop member.

According to an aspect of another example embodiment, an inflatable product may comprise a pipe connection assembly as described above.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
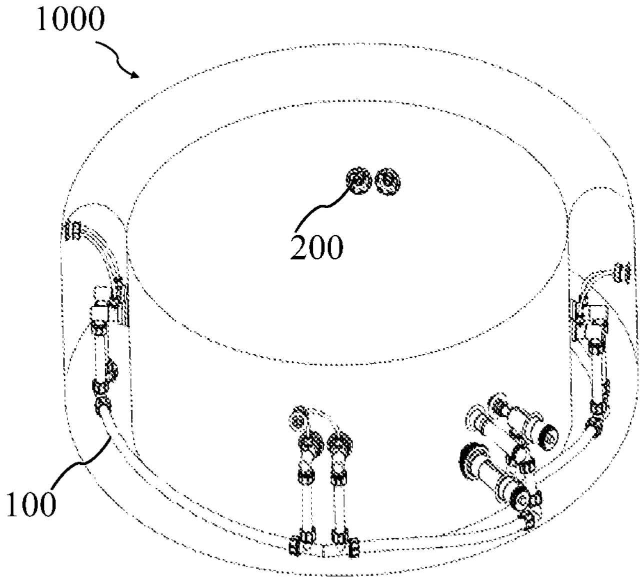
FIG. 1 is a perspective view of a pool according to an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms “include,” “including”, “comprise, and/or “comprising,” when used in this specification, specify the presence of stated features, integers, steps, operations, elements, and/or components, but do not preclude the presence or addition of one or more other features, integers, steps, operations, elements, components, and/or groups thereof.

It will be further understood that, although the terms “first,” “second,” “third,” etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term “and/or” includes any and all combinations of one or more of the associated listed items. Expressions such as “at least one of,” when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

It should be noted that the orientation or position relationships indicated by the terms such as “upper”, “lower”, “inner” and “bottom” are based on the orientation or position relationships shown in the drawings or the orientation or position relationships in which a product is customarily placed during use, and are only intended to facilitate description.

It should also be noted that the terms “arranged,” “connected,” and “connection” should be understood in a broad sense, unless otherwise explicitly specified and limited. For example, a connection may be a fixed connection, a detachable connection, or an integral connection; or may be a mechanical connection or an electrical connection; or may be a direct connection, or an indirect connection by means of an intermediate medium, or communication between interiors of two elements.

According to an example embodiment, a pipe connection assembly is provided, which is composed of a joint, a hose fixing member, and a hose.

One or more example pipe connection assemblies described herein may be applied to, but should not be limited to, SPA pools, inflatable floating mats, inflatable beds/mattresses, and other inflatable products that use pipes for delivery of fluid such as water or air.

Example embodiments described herein take the application of a pipe connection assembly to a SPA pool as an example.

First Example Embodiment

Figure 2:
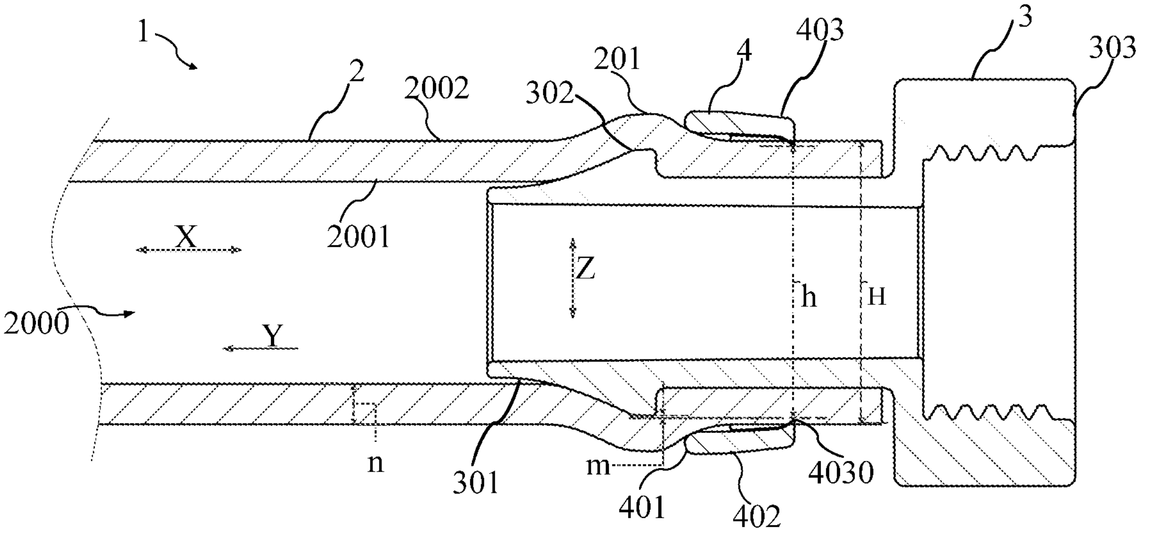
FIG. 2 is a cross-sectional view of a pipe connection assembly according to a first example embodiment, with a fixing member in the pipe connection assembly comprising claws.
Figure 3:
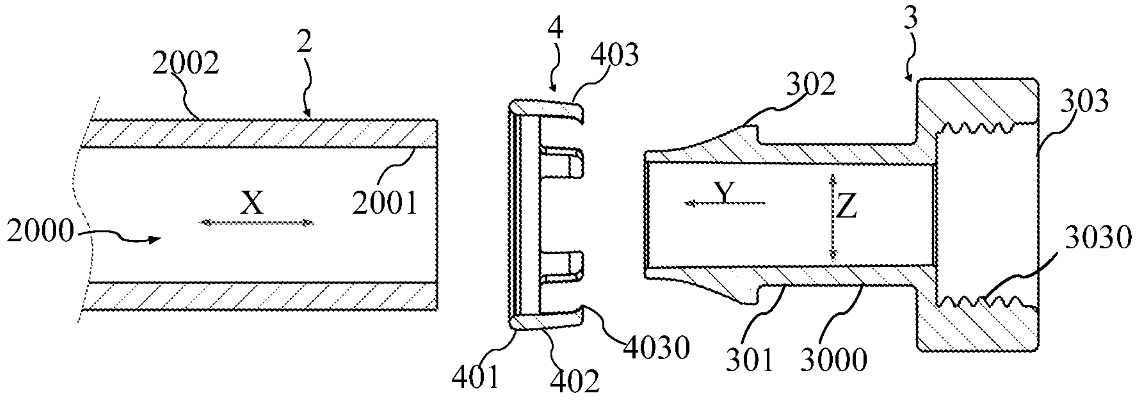
FIG. 3 is an exploded view of the pipe connection assembly according to the first example embodiment, with the fixing member in the pipe connection assembly comprising claws.

Referring to FIGS. 2 and 3, a pipe connection assembly 1 according to an example embodiment comprises: a first pipe 2, a second pipe 3 (which may be, for example, a joint that comprises a portion extending into an inner cavity of the first pipe 2), and a fixing member 4. A part of the second pipe 3 is inserted into the first pipe 2. Taking an example in which the second pipe 3 is a joint, the first pipe 2 may be made of a soft material (e.g. silicone or polyvinyl chloride (PVC));

and the second pipe 3 may be made of a material which is harder than that of the first pipe 2. Alternately, at least a portion of the second pipe 3 which is inserted to the inner cavity 2000 of the first pipe 2 may be made of a material harder than that of the first pipe 2, so that the second pipe 3 can press the first pipe 2 to cause a certain amount of deformation of the first pipe 2, with a shape of the part the second pipe 3 in contact with the first pipe 2 remaining substantially unchanged. A first end (i.e., an insertion end 301) of the second pipe 3 in a lengthwise direction (shown as an X-direction in FIG. 2) is configured to be inserted into the inner cavity 2000 of the first pipe 2, and a second end 303 is configured to be connected to other parts of a pipeline.

According to an example embodiment, the insertion end 301 of the second pipe 3 is cylindrical and comprises a first protrusion 302. The insertion end 301 is inserted into the inner cavity 2000 of the first pipe 2 (with the insertion direction of the second pipe 3 relative to the first pipe 2 being a Y-direction as shown in FIGS. 2 and 3). A cavity wall 2001 of the inner cavity 2000 of the first pipe 2 fits around an outer wall 3000 of the insertion end 301 of the second pipe 3. During insertion, the first protrusion 302 presses outward on the cavity wall 2001 of the inner cavity 2000 of the first pipe 2. Since the first protrusion 302 protrudes outwards in a radial direction (shown as a Z-direction in FIGS. 2 and 3), the first protrusion 302 presses the cavity wall 2001 of the inner cavity 2000 of the first pipe 2 outwards in the radial direction to push up the cavity wall 2001 of the inner cavity 2000 of the first pipe 2 in the radial direction so as to form a second protrusion 201 in the pipe wall (including an outer wall 2002) of the first pipe 2, as shown in FIG. 2.

Referring to FIGS. 2 and 3, the fixing member 4 is sleeved on the outer periphery of the first pipe 2 and located between the second end 303 of the second pipe 3 and the second protrusion 201. The second protrusion 201 is thereby held between the fixing member 4 and the first protrusion 302 to provide a seal at the connection of the first pipe 2 and the second pipe 3, to aid in the prevention of leakage of liquid.

In addition, referring to FIG. 2, the second protrusion 201 limits the position of the fixing member 4 in the lengthwise direction (shown as the X-direction in FIG. 2) to prevent the fixing member 4 from sliding out of the first pipe 2 in the lengthwise direction, and the fixing member 4 itself presses the outer wall 2002 of the first pipe 2 in the radial direction (shown as the Z-direction in FIG. 2) to allow close fit between the cavity wall 2001 of the inner cavity 2000 of the first pipe 2 and the outer wall of the insertion end 301 of the second pipe 3, thus providing a sealed connection between the first pipe 2 and the second pipe 3, to prevent the first pipe 2 from being detached from the second pipe 3. This connection may be convenient and may provide a good sealing connection as compared with a connection using a rigid rubber-coated joint and a nut. This connection may also reduce a cost of the connection.

Figure 4:
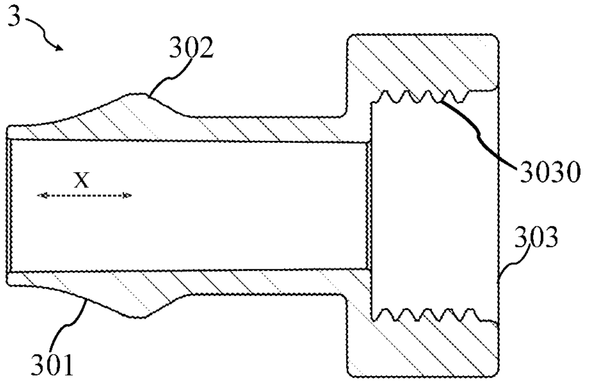
FIG. 4 is a first schematic structural diagram of a second pipe in the pipe connection assembly according to the first example embodiment, with a second end of a second pipe having an internal thread.

Optionally, referring to FIG. 3, the first protrusion 302 may entirely surround the insertion end 301 of the second pipe 3, in a circumferential direction. A slope of a side of the first protrusion 302 facing away from the second end 303 of the second pipe 3 may be longer and shallower than a slope of the side of the first protrusion 302 facing the second end 303 of the second pipe 3. Alternately, according to one or more example embodiments, the first protrusion 302 may be discontinuously distributed around the insertion end 301 in a circumferential direction thereof. Furthermore, alternately, as shown in FIG. 4, the slope of the side of the first protrusion 302 close to the second end 303 of the second pipe 3 may be approximately the same as that of the side thereof away from the second end of the second pipe. As shown in FIG. 2, the second pipe 3 which has another cross-sectional shape and can form the second protrusion 201 on the pipe wall of the first pipe 2 may also be configured as the pipe connection assembly.

Figure 5:
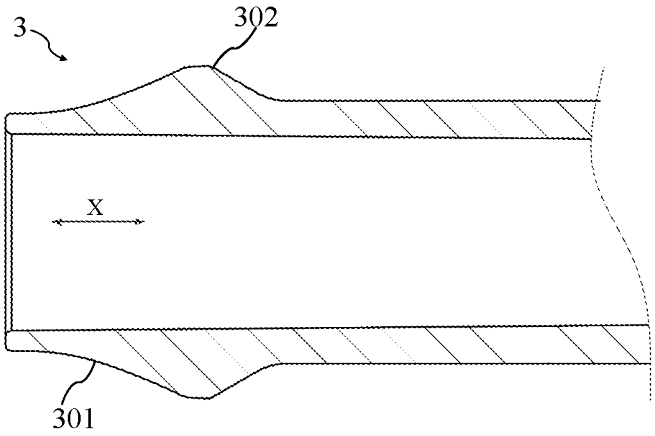
FIG. 5 is a second schematic structural diagram of the second pipe in the pipe connection assembly according to the first example embodiment, with the second end of the second pipe having no internal thread.

With reference to FIG. 4, an inner wall of the second end 303 of the second pipe 3 may comprise an internal thread 3030. According to one or more example embodiments, referring to FIG. 5, and in conjunction with FIG. 4, the structure of the second end 303 may be configured to correspond to a structure of a pipeline to which the second end 303 of the second pipe 3 is to be connected. For example, the second pipe 3 may alternately have no internal thread 3030.

Referring to FIGS. 2 and 3, in this example embodiment, the fixing member 4 comprises a first end 401 and a second end 402. The first end 401 may take the shape of a closed ring and may abut against the second protrusion 201. The second end 402 may comprise a plurality of circumferentially-spaced claws 403, and each claw 403 may extend away from the second protrusion 201 and engage with the outer wall 2002 of the first pipe 2 in a clamping manner. The first end 401 of the fixing member 4 may be located between the second protrusion 201 and the second end 402 of the fixing member 4.

The claws 403 may extend from the second end 402 in the lengthwise direction and extend towards the second end 303 of the second pipe 3. An end portion, close to the second end 303 of each claw 403 may be curved inwards in the radial direction to form a limiting portion 4030, at the end portion 403, with a substantially acute angle in cross-section. An inner diameter h between opposing ones of the plurality of limiting portions 4030, may be less than the outer diameter H of the first pipe 2, so that the limiting portions 4030 of the claws 403 can be clamped to the outer wall 2002 of the first pipe 2 in the radial direction, aid in fixing the position of the fixing member 4 relative to the first pipe 2.

As an example, referring to FIG. 2, a distance m, in the radial direction (shown as the Z-direction in FIG. 2), between the plurality of limiting portions 4030 and the first protrusion 302 is less than the thickness n of the pipe wall of the first pipe 2. Such an arrangement enables the limiting portions 4030 of the claws 403 to be clamped to the outer wall 2002 of the first pipe 2 to restrain the first pipe 2 from sliding relative to the fixing member 4 and thus being detached from the second pipe 3. The second protrusion 201 is formed on the pipe wall of the first pipe 2, and the second protrusion 201 is held by the fixing member 4 and the first protrusion 302 together to allow the first pipe 2 to be sealed to the second pipe 3.

For assembly of the above-described pipe connection assembly, the fixing member 4 is sleeved on the outer side of the second pipe 3, and the first pipe 2 is inserted between the second pipe 3 and the fixing member 4. The fixing member 4 may be moved on an outside surface of the first pipe 2 to allow the first pipe 2 to be held between the fixing member 4 and the second pipe 3 and allow the limiting portions 4030 to come into contact with the first pipe 2.

Figure 6:
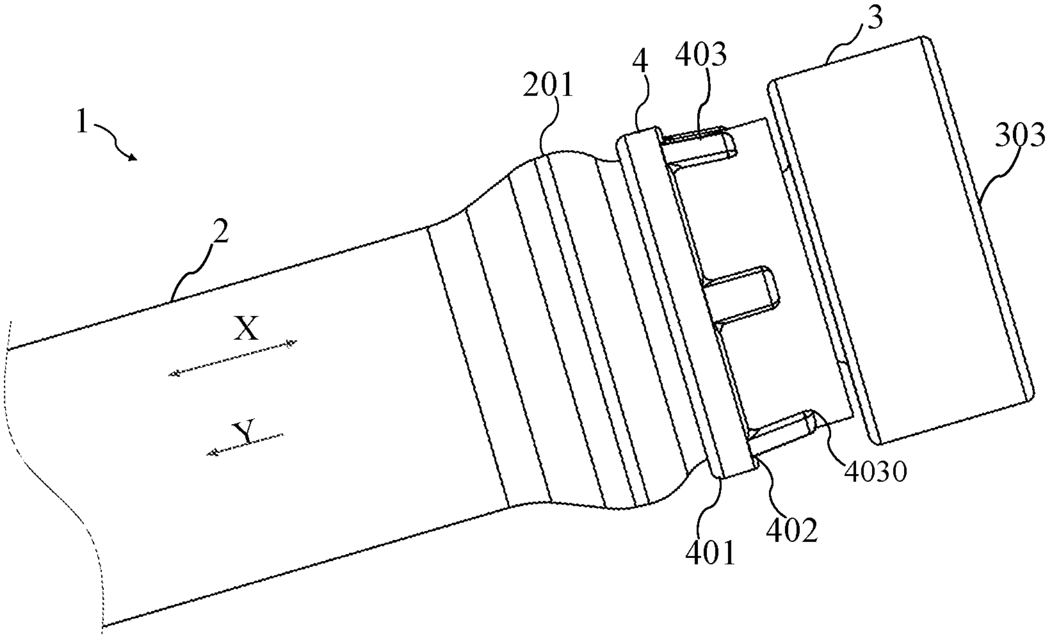
FIG. 6 is a perspective view of the pipe connection assembly according to the first example embodiment, with the fixing member in the pipe connection assembly comprising claws.

Referring to FIGS. 2 and 6, if the first pipe 2 is accidentally pulled and thus begins sliding in the insertion direction (shown as the Y-direction in FIG. 6) of the insertion end 301, the fixing member 4 also slides with the first pipe 2 until the fixing member 4 slides to the second protrusion 201, and the first end 401 of the fixing member 4 abuts against the second protrusion 201. That is, the sliding of the fixing member 4 and the first pipe 2 in the lengthwise direction is limited, so as to ensure the sealing connection between the first pipe 2 and the second pipe 3.

Second Example Embodiment

Figure 7:
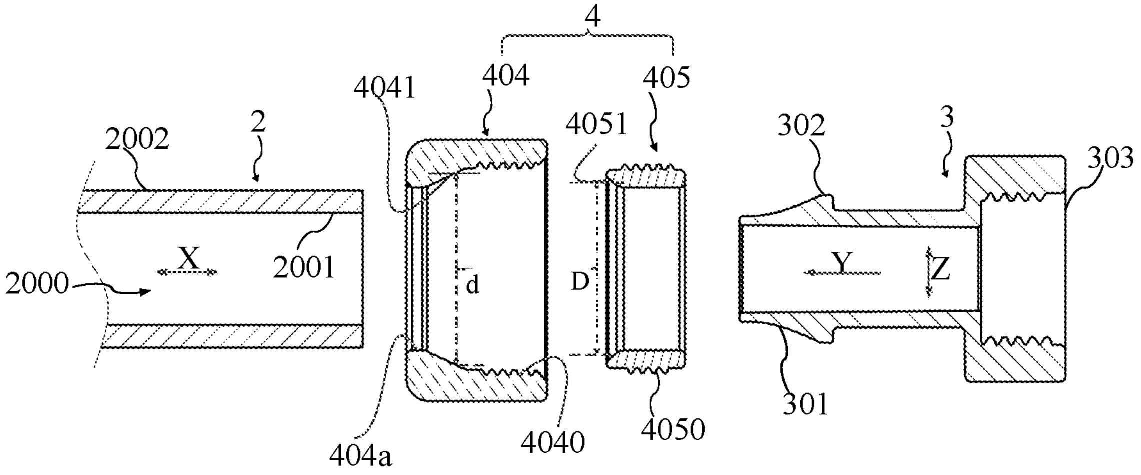
FIG. 7 is an exploded view of a pipe connection assembly according to a second example embodiment, with a fixing member in the pipe connection assembly comprising two threaded connectors.

A pipe connection assembly according to this example embodiment is substantially the same as that of the first example embodiment. The difference from the first example embodiment lies in that the specific structure of the fixing member in this example embodiment is different from the structure of the fixing member in the first example embodiment. Referring to FIG. 3, in the first example embodiment, the fixing member 4 has a hollow cylindrical structure comprising claws 403. Referring to FIG. 7, in this example embodiment, the fixing member 4 comprises two fixing components which cooperate with each other.

Figure 8:
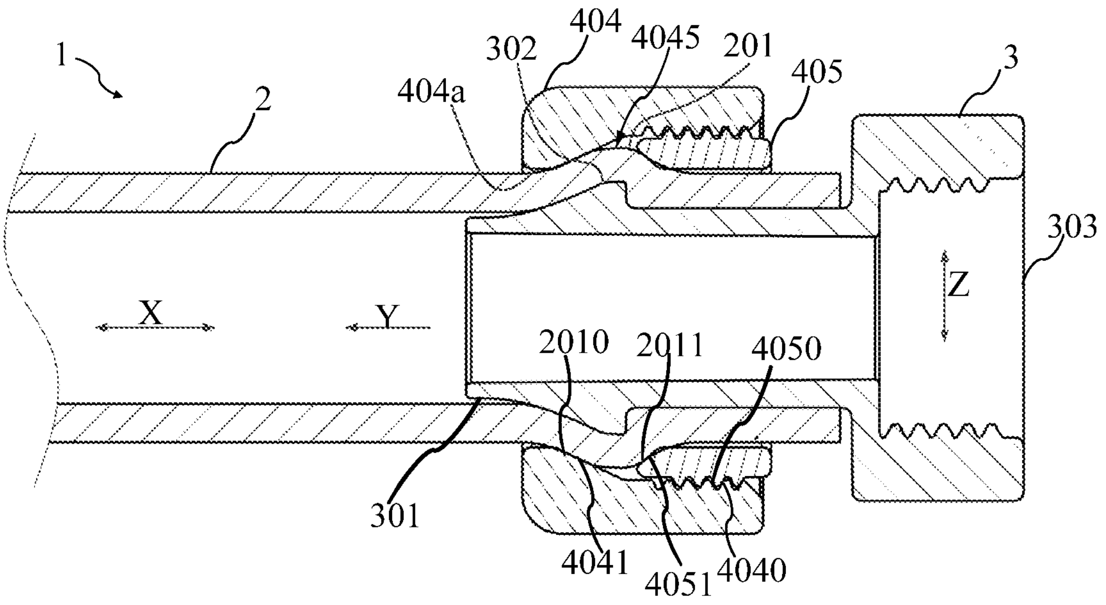
FIG. 8 is a cross-sectional view of the pipe connection assembly according to the second example embodiment, with the fixing member in the pipe connection assembly comprising two threaded connectors.
Figure 9:
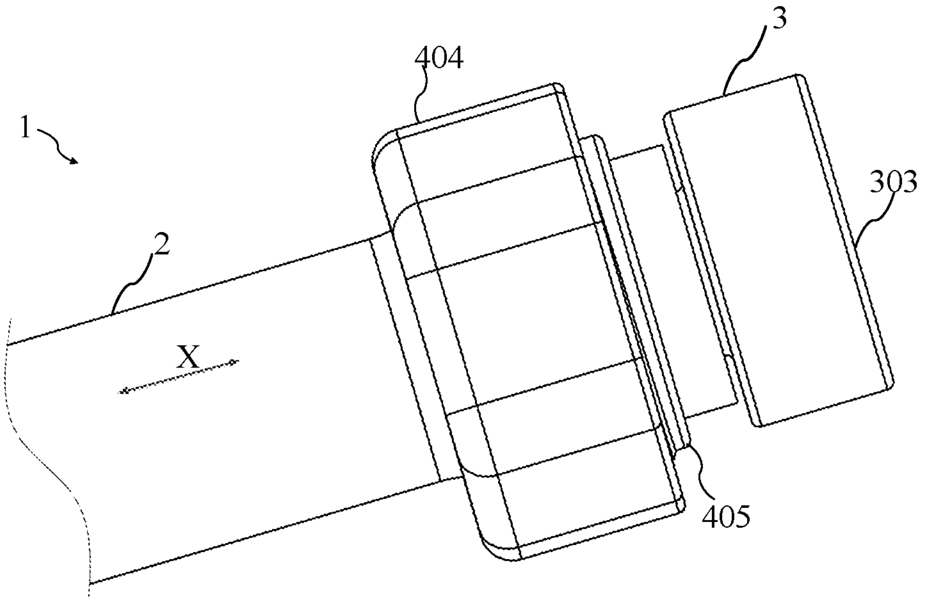
FIG. 9 is a perspective view of the pipe connection assembly according to the second example embodiment, with the fixing member in the pipe connection assembly comprising two threaded connectors.

For example, referring to FIGS. 7 to 9, in this example embodiment, the fixing member 4 comprises a first threaded connector (i.e., a first fixing component) 404 and a second threaded connector (i.e., a second fixing component) 405. The first threaded connector 404 is detachably connected to the second threaded connector 405, and the first threaded connector 404, the second threaded connector 405 and the first protrusion 302 together define a holding space 4045. The second protrusion 201 is disposed in the holding space 4045. That is to say, the second protrusion 201 is held by the first threaded connector 404, the second threaded connector 405 and the first protrusion 302, together, such that the first threaded connector 404 and the second threaded connector 405 are fixed relative to the second protrusion 201, so as to press the first pipe 2 and the second pipe 3 in the radial direction to achieve a sealing connection between the first pipe 2 and the second pipe 3.

Referring to FIGS. 7 to 9, the first threaded connector 404 and the second threaded connector 405 are connected to each other by means of an internal thread 4040 of the first threaded connector 404 engaging with an external thread 4050 of the second threaded connector 405. As an example, the two ends of the second protrusion 201 in the lengthwise direction (shown as the X-direction in FIG. 8) are respectively an upper slope 2010 and a lower slope 2011.

Referring to FIGS. 7 and 8, an inner wall of the first threaded connector 404 comprises a first stop portion 4041, and an inner wall of the second threaded connector 405 is provided with a second stop portion 4051. The first stop portion 4041, the second stop portion 4051 and the first protrusion 302 together define the holding space 4045.

As an example, referring to FIGS. 7 and 8, the second threaded connector 405 is sleeved on an outer wall 2002 of the first pipe 2, the first threaded connector 404 is sleeved on the second threaded connector 405, and the internal thread 4040 of the first threaded connector 404 is engaged with the external thread 4050 of the second threaded connector 405, so that the first pipe 2 and the second pipe 3 are tightly pressed to achieve the sealing connection between the first pipe 2 and the second pipe 3 and aid in preventing the first pipe 2 from being detached from the second pipe 3.

Referring to FIGS. 7 and 8, both the first stop portion 4041 and the second stop portion 4051 are sloped towards the second protrusion 201, and the first stop portion 4041, the second stop portion 4051 and the first protrusion 302 together define the holding space 4045. That is, the first stop portion 4041 faces the upper slope 2010 of the second protrusion 201, and the second stop portion 4051 faces the lower slope 2011 of the second protrusion 201, so as to allow the first stop portion 4041 to abut against the upper slope 2010 of the second protrusion 201 and allow the second stop portion 4051 to abut against the lower slope 2011 of the second protrusion 201, so that the second protrusion 201 is limited in the holding space 4045 to achieve the fixed connection between the first pipe 2 and the second pipe 3.

As an example, referring to FIGS. 7 and 8, in the insertion direction of the insertion end 301 (shown as the Y-direction in FIG. 7), the inner diameter d of the first stop portion 4041 gradually decreases, and the inner diameter D of the second stop portion 4051 gradually increases. That is, in the insertion direction of the insertion end 301, the inner diameter d of the first threaded connector 404 at the first stop portion 4041 gradually decreases, and, in contrast, the inner diameter D of the second threaded connector 405 at the second stop portion 4051 gradually increases, which respectively adapt to the upper slope 2010 and the lower slope 2011 of the second protrusion 201, so that the first stop portion 4041 abuts against the upper slope 2010 of the second protrusion 201, and the second stop portion 4051 abuts against the lower slope 2011. In this way, the fixed connection between the first pipe 2 and the second pipe 3 by the fixing member 4 is achieved.

Referring to FIG. 8, an inner wall of the first threaded connector 404 comprises a pressing end 404*a*, the first stop portion 4041 is disposed between the pressing end 404*a* and the second stop portion 4051, and the pressing end 404*a* is pressed against the outer wall 2002 of the first pipe 2. As an example, the pressing end 404*a* is the end portion, away from the second end 303 of the second pipe 3, of the first threaded connector 404. Referring to FIGS. 7 and 8, the pressing end 404*a* of the first threaded connector 404 applies a force on the outer wall 2002 of the first pipe 2 in the radial direction, so as to press the first pipe 2, so that the cavity wall 2001 of the inner cavity 2000 of the first pipe 2 fits with the insertion end 301 of the second pipe 3 more closely to effectively prevent the problems, such as the first pipe 2 bulging, caused by water entering the part where the first pipe 2 is connected to the second pipe 3.

Third Example Embodiment

This example embodiment is a variation based on the second example embodiment, and is different from the second example embodiment in that the second threaded connector has a different structure in this example embodiment. In the second example embodiment, the second threaded connector is integrally formed, and has an integrally formed annular cross-section. However, in this example embodiment, the second threaded connector is formed by two separated-type components assembled together.

Figure 10:
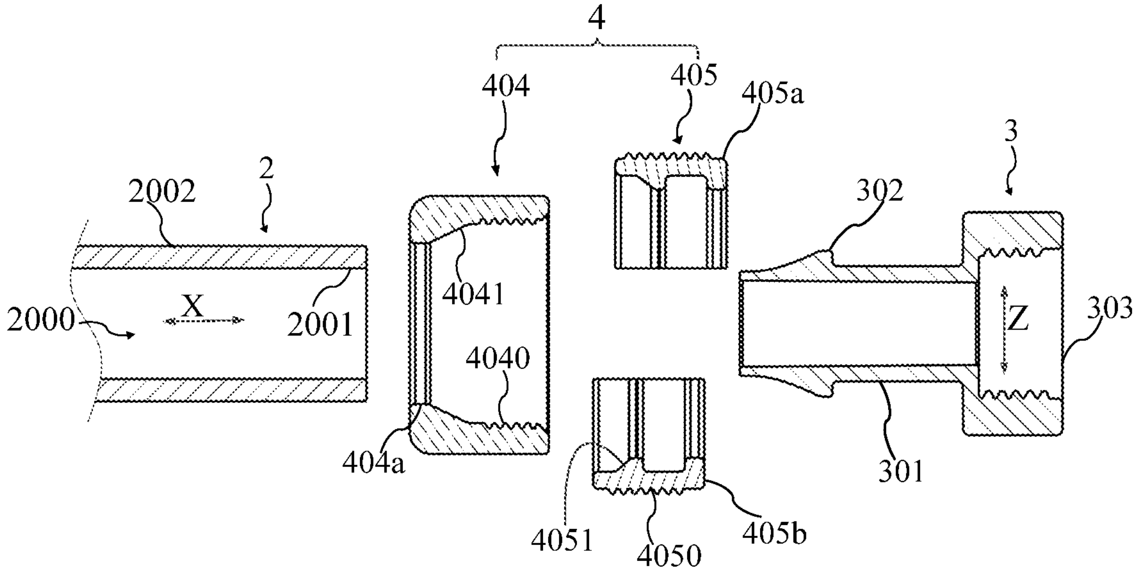
FIG. 10 is an exploded view of a pipe connection assembly according to a third example embodiment, with a fixing member in the pipe connection assembly comprising two threaded connectors, one of which comprises two separated-type components.
Figure 11:
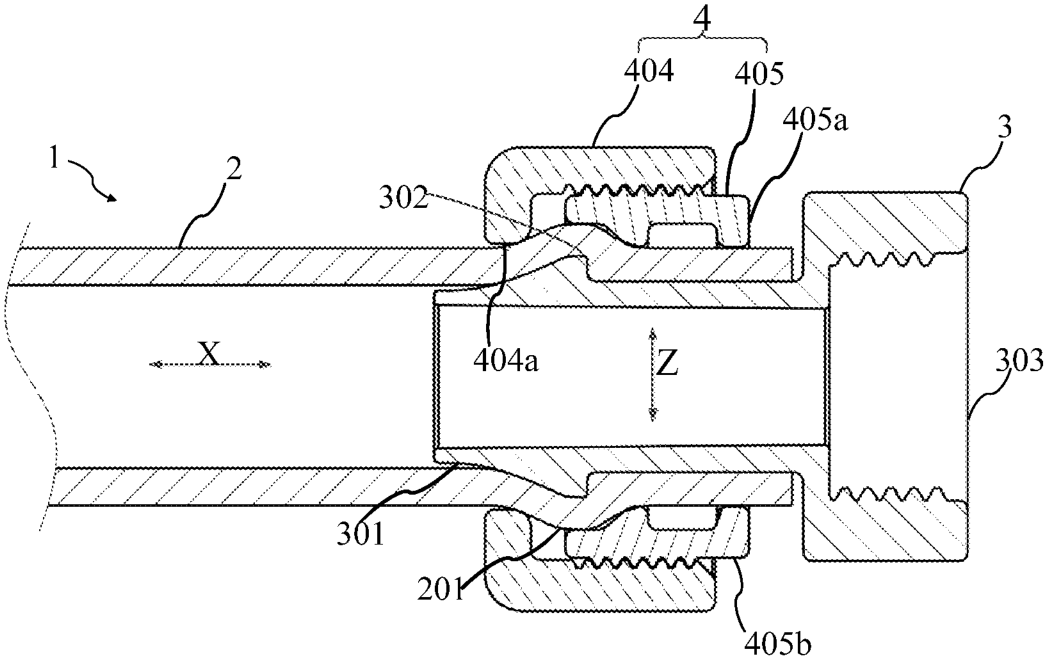
FIG. 11 is a cross-sectional view of the pipe connection assembly according to the third example embodiment, with the fixing member in the pipe connection assembly comprising two threaded connectors, one of which comprises two separated-type components.

Specifically, referring to FIGS. 10 and 11, the second threaded connector 405 is formed by a first portion 405*a* and a second portion 405*b* which are assembled together in the Z-direction shown in FIG. 10. That is, the second threaded connector 405 may have an integrally formed annular cross-section (as in the second example embodiment), or may be alternatively formed by the first portion 405*a* and the second portion 405*b*, having a semi-annular cross-section, as shown in FIG. 10 assembled together, and the positions of parts of the second threaded connector 405 are limited by the first threaded connector 404. It should be understood that, in other example embodiments, the second threaded connector 405 may be formed by more (e.g., three) portions assembled together.

Fourth Example Embodiment

Compared with the first example embodiment, the second example embodiment and the third example embodiment, the fixing member of the pipe connection assembly in this example embodiment has different specific structure, while the first pipe and the second pipe have the same or substantially the same structure.

Specifically, referring to FIGS. 12 to 15, the fixing member 4 in this example embodiment comprises a hoop 408. The hoop 408 is sleeved on an outer wall 2002 of the first pipe 2, and the first pipe 2 and the insertion end 301 are fixedly connected by means of the hoop 408 in the radial direction (shown as the Z-direction in FIG. 13). As an example, the hoop 408 is sleeved on the outer wall 2002 of the first pipe 2 and tightly presses the first pipe 2 and the second pipe 3 in the radial direction, so as to effectively prevent the first pipe 2 from being detached from the second pipe 3.

Figure 12:
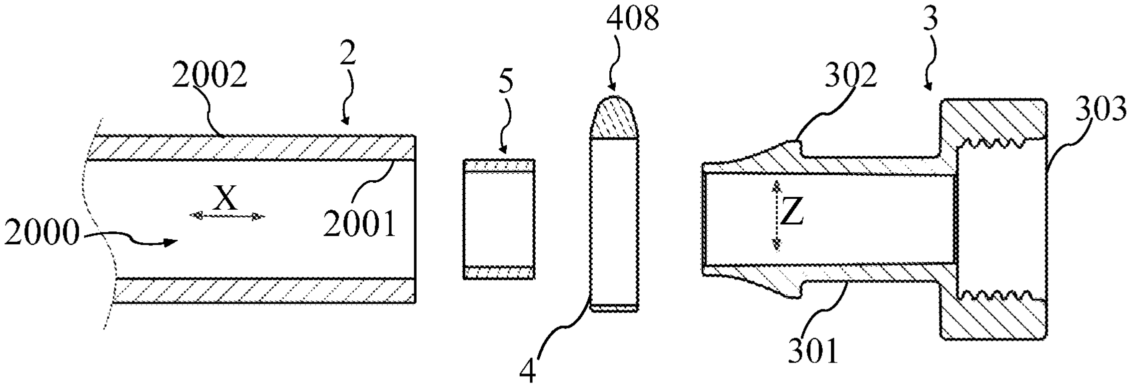
FIG. 12 is an exploded view of a pipe connection assembly according to a fourth example embodiment, with a fixing member in the pipe connection assembly comprising a hoop.
Figure 13:
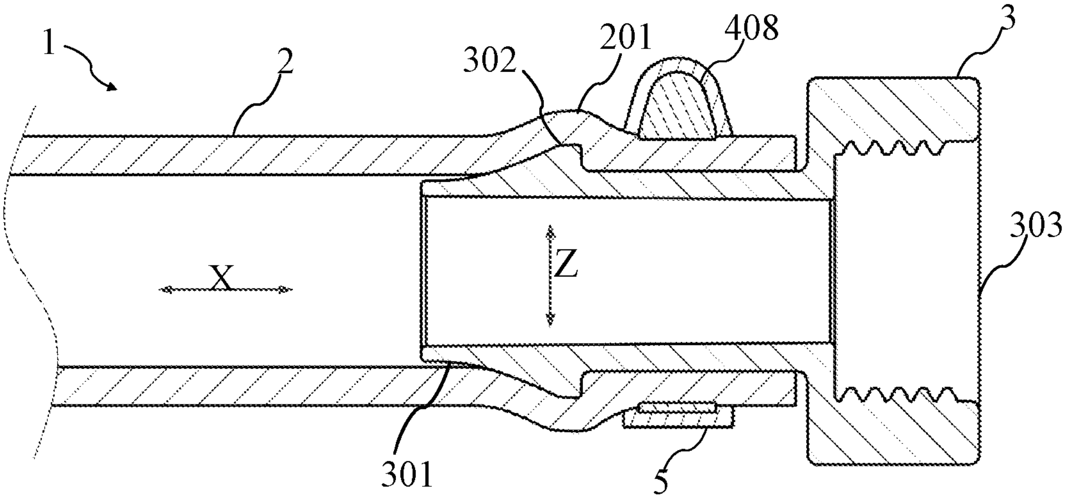
FIG. 13 is a cross-sectional view of the pipe connection assembly according to the fourth example embodiment, with the fixing member in the pipe connection assembly comprising a hoop.
Figure 14:
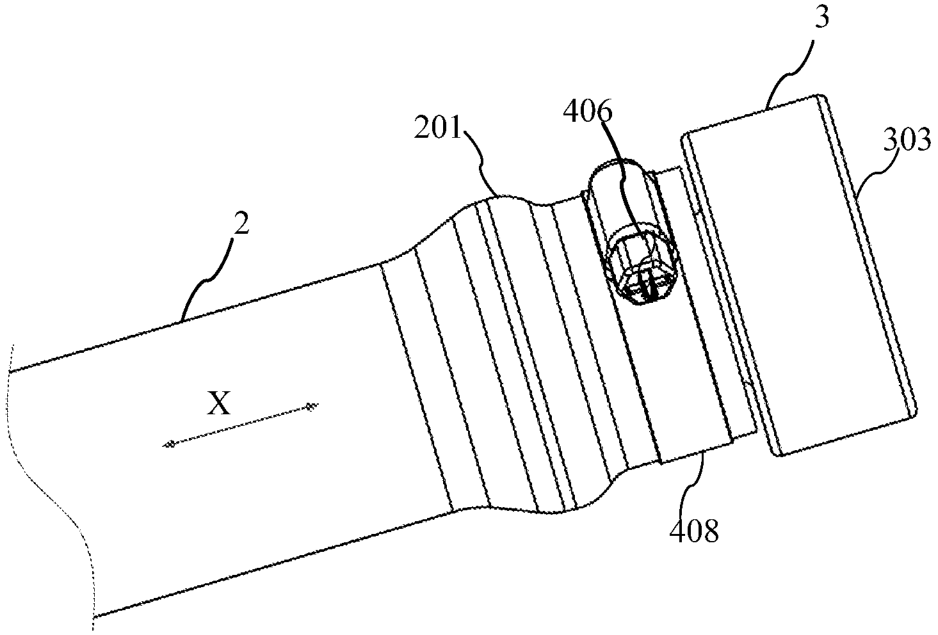
FIG. 14 is a perspective view of the pipe connection assembly according to the fourth example embodiment, with the fixing member in the pipe connection assembly comprising a hoop.
Figure 15:
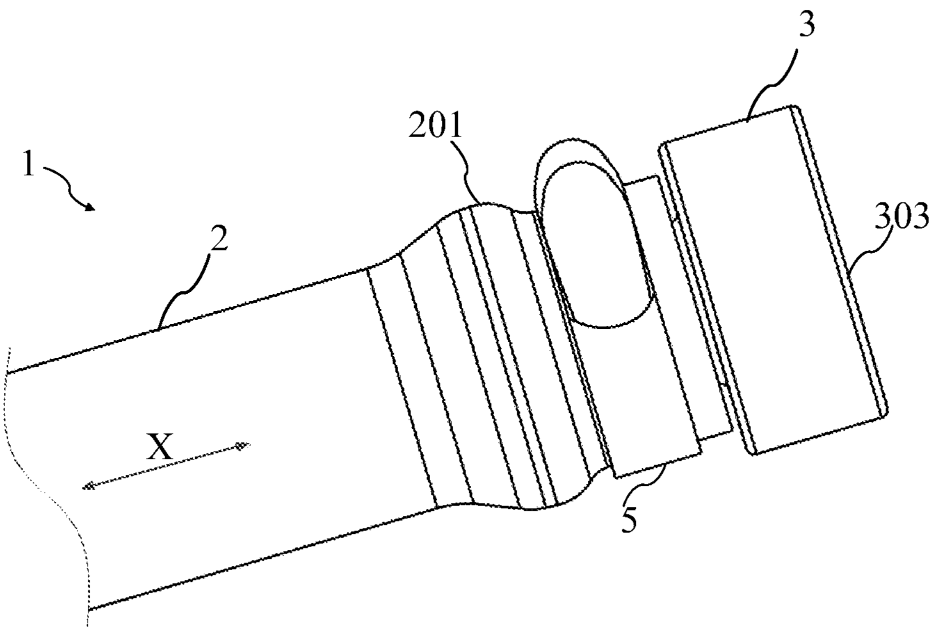
FIG. 15 is a perspective view of the pipe connection assembly according to the fourth example embodiment comprising a protective sleeve, with the fixing member in the pipe connection assembly comprising a hoop.

Referring to FIGS. 12 to 14, in a case in which the hoop 408 is used as the fixing member 4, there is a protrusion 406 after the hoop 408 is mounted. For a product including such a pipe connection assembly, the protrusion 406 may damage (e.g., scratch) other parts of the product. For example, when the pipe connection assembly 1 is used in an inflatable chamber of an inflatable product (e.g., an inflatable pool) or used to connect different air chambers of an inflatable product, there is a risk of the protrusion 406 scratching the wall of the inflatable chamber of the inflatable product because the inflatable product is folded during transportation or storage. In view of this, the pipe connection assembly further comprises a protective sleeve 5. The protective sleeve 5 is wrapped around the periphery of the hoop 408 to wrap the protrusion 406 (as shown in FIG. 15), so as to effectively prevent the protrusion 406 from scratching the wall of the inflatable chamber of the inflatable product.

Fifth Example Embodiment

Compared with the first example embodiment, the second example embodiment, the third example embodiment and the fourth example embodiment described above, the fixing member of the pipe connection assembly in this example embodiment has a different structure, while the first pipe and the second pipe have the same structure.

Specifically, referring to FIGS. 16 to 19, the fixing member 4 comprises a steel wire hoop 409. The steel wire hoop 409 is sleeved on the outer wall 2002 of the first pipe 2, and the first pipe 2 is fixedly connected to the insertion end 301 in a radial direction (shown as the Z-direction in FIG. 17) by means of the steel wire hoop 409. As an example, the steel wire hoop 409 is sleeved on an outer wall 2002 of the first pipe 2, and the first pipe 2 and the second pipe 3 are tightly pressed by the steel wire hoop 409 in the radial direction, so as to effectively prevent the first pipe 2 from being detached from the second pipe 3.

Figure 16:
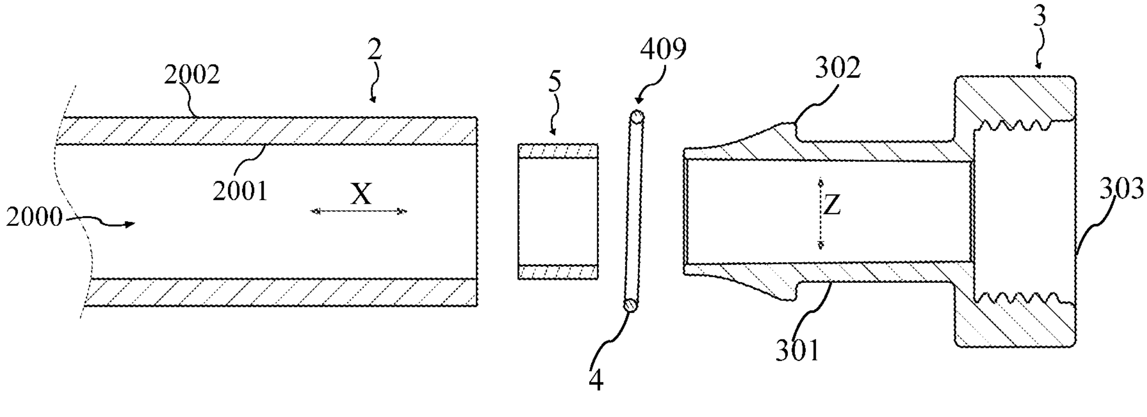
FIG. 16 is an exploded view of a pipe connection assembly according to a fifth example embodiment, with a fixing member in the pipe connection assembly comprising a steel wire hoop.
Figure 17:
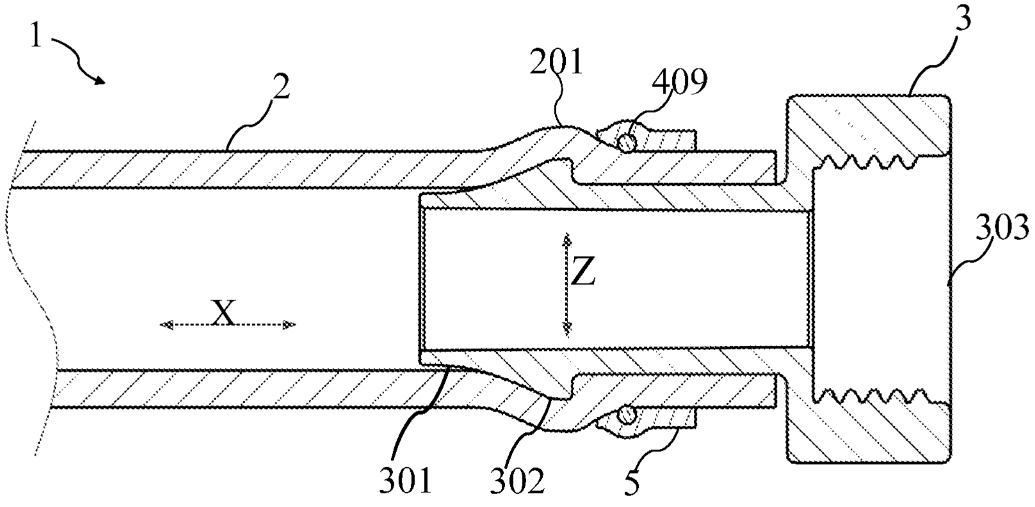
FIG. 17 is a cross-sectional view of the pipe connection assembly according to the fifth example embodiment, with the fixing member in the pipe connection assembly comprising a steel wire hoop.
Figure 18:
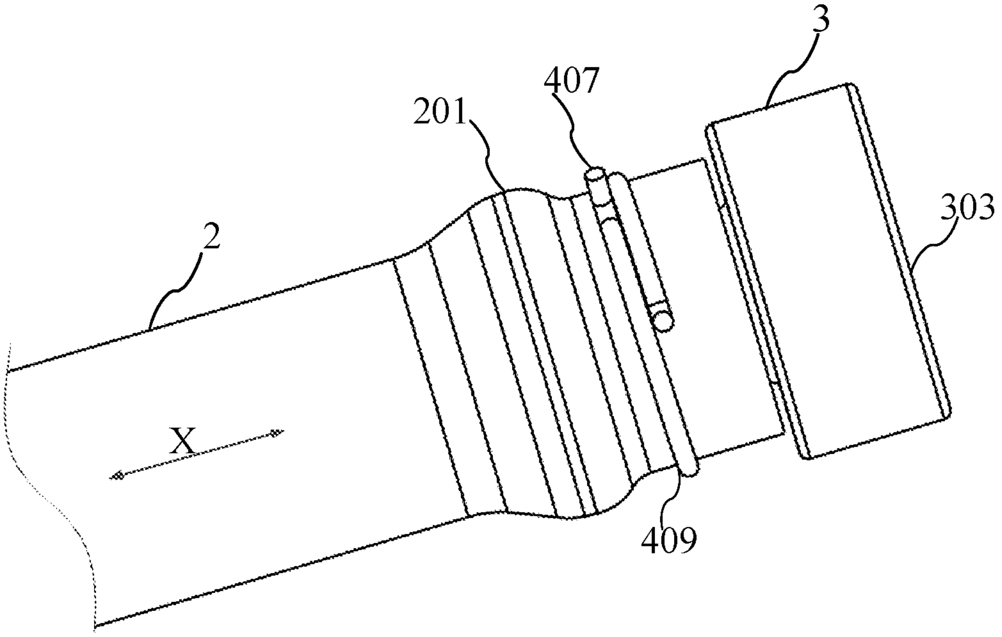
FIG. 18 is a perspective view of the pipe connection assembly according to the fifth example embodiment, with the fixing member in the pipe connection assembly comprising a steel wire hoop.
Figure 19:
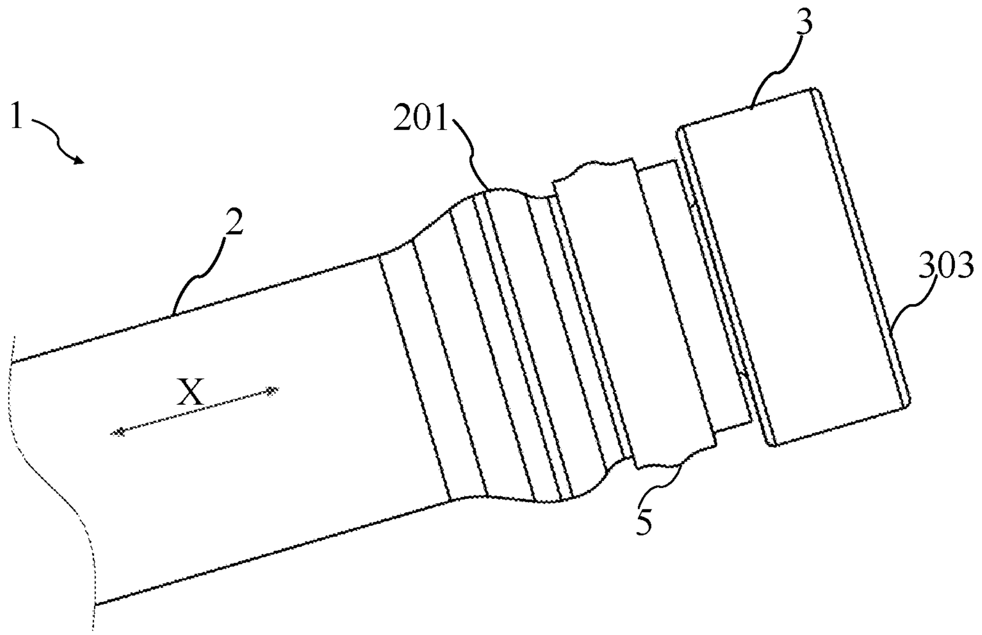
FIG. 19 is a perspective view of the pipe connection assembly according to the fifth example embodiment comprising a protective sleeve, with the fixing member in the pipe connection assembly comprising a steel wire hoop.

Optionally, referring to FIGS. 16 and 17, the pipe connection assembly further comprises a protective sleeve 5. The protective sleeve 5 is wrapped around the periphery of the steel wire hoop 409. Similar to the example embodiments shown in FIGS. 12 to 14, after the steel wire hoop 409 is mounted, the protective sleeve 5 is wrapped around the periphery of the steel wire hoop 409, so as to effectively prevent a protrusion 407 from scratching a wall of an inflatable chamber of an inflatable product.

The pipe connection assemblies described above may be used for an inflatable product, such as an inflatable pool (e.g., an inflatable SPA pool). The pipe connection assemblies may be used as a part of a pipeline that is used for delivering water or air into a pool or for discharging water or air from the pool.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A pipe connection assembly, comprising:

a first pipe comprising a first end, a second end and a tubular wall between the first and second ends, the tubular wall having an outer periphery;

a second pipe comprising:

an insertion portion inserted into the first pipe from the second end of the first pipe, and a first protrusion protruding radially outward from the insertion portion and forcing the tubular wall of the first pipe to expand radially outward to form a second protrusion; and a fixing member sleeved around an outer periphery of the first pipe and disposed between the second protrusion and the second end of the first pipe, the fixing member comprising:

a first end abutting against the second protrusion;

a second end disposed between the first end of the fixing member and the second end of the second pipe; and a plurality of circumferentially-spaced claws engaging with an outer periphery of the first pipe, each of the plurality of circumferentially-spaced claws having an end portion curved inwards in a radial direction to form a limiting portion;

wherein the limiting portion has an acute angle in cross-section.

2. The pipe connection assembly of claim 1, wherein the second protrusion is positioned between the fixing member and the first protrusion and forms a seal between the first pipe and the second pipe.

3. The pipe connection assembly of claim 1, wherein the second protrusion forms a stop between the fixing member and the first pipe to prevent the fixing member from sliding out of the first pipe.

4. The pipe connection assembly of claim 1, wherein the first protrusion entirely surrounds the insertion portion of the second pipe in a circumferential direction.

5. The pipe connection assembly of claim 1, wherein the second end of the second pipe includes an internal thread used to couple the first pipe to the second pipe.

6. The pipe connection assembly of claim 1, wherein the plurality of circumferentially-spaced claws extend from the second end of the fixing member in a lengthwise direction and extend towards the second pipe.

7. The pipe connection assembly of claim 1, wherein an inner diameter defined between each of the plurality of circumferentially-spaced claws is less than an outer diameter of the first pipe.

8. The pipe connection assembly of claim 1, wherein the limiting portion of each of the plurality of circumferentially-spaced claws is clamped to the outer periphery of the tubular wall of the first pipe.

9. The pipe connection assembly of claim 1, wherein a radial distance between each limiting portion of the plurality of circumferentially-spaced claws and the first protrusion of the second pipe is less than a thickness of the tubular wall of the first pipe.

10. An inflatable product having a pipe assembly, the pipe assembly comprising:

a first pipe comprising a first end, a second end and a tubular wall between the first and second ends, the tubular wall having an outer periphery;

a second pipe comprising:

an insertion portion inserted into the first pipe from the second end of the first pipe, and a first protrusion protruding radially outward from the insertion portion and forcing the tubular wall of the first pipe to expand radially outward to form a second protrusion; and a fixing member sleeved around an outer periphery of the first pipe and disposed between the second protrusion and the second end of the first pipe, the fixing member comprising:

a first end abutting against the second protrusion;

a second end disposed between the first end of the fixing member and the second end of the second pipe; and a plurality of circumferentially-spaced claws engaging with an outer periphery of the first pipe, each of the plurality of circumferentially-spaced claws having an end portion curved inwards in a radial direction to form a limiting portion wherein the limiting portion has an acute angle in cross-section.

11. The inflatable product of claim 10, wherein the plurality of circumferentially-spaced claws extend from the second end of the fixing member in a lengthwise direction and extend towards the second pipe.

12. The inflatable product of claim 10, wherein an inner diameter defined between each of the plurality of circumferentially-spaced claws is less than an outer diameter of the first pipe.

13. The inflatable product of claim 10, wherein a radial distance between each limiting portion of the plurality of circumferentially-spaced claws and the first protrusion of the second pipe is less than a thickness of the first pipe.

14. The inflatable product of claim 10, wherein the second protrusion is positioned between the fixing member and the first protrusion and forms a seal between the first pipe and the second pipe.

15. The inflatable product of claim 10, wherein the second protrusion forms a stop between the fixing member and the first pipe to prevent the fixing member from sliding out of the first pipe.

16. An inflatable product comprising:

at least one inflatable chamber defining at least one tubular wall having an outer periphery; and a pipe assembly comprising:

a pipe including an insertion portion inserted into the at least one inflatable chamber;

a protrusion protruding radially outward from the insertion portion and forcing the at least one tubular wall to expand radially outward to form a second protrusion; and a fixing member comprising:

a plurality of circumferentially-spaced claws engaging with the outer periphery of the at least one tubular wall, each of the plurality of circumferentially-spaced claws having an end portion curved inwards in a radial direction to form a limiting portion wherein the limiting portion has an acute angle in cross-section.

17. The inflatable product of claim 16, wherein the plurality of circumferentially-spaced claws extend from the fixing member in a lengthwise direction and extend towards the pipe.

18. The inflatable product of claim 16, wherein an inner diameter defined between each of the plurality of circumferentially-spaced claws is less than an outer diameter of the pipe.

19. The inflatable product of claim 16, wherein the limiting portion of each of the plurality of circumferentially-spaced claws is clamped to the outer periphery of the tubular wall.

20. The inflatable product of claim 16, wherein a radial distance between each limiting portion of the plurality of circumferentially-spaced claws and the protrusion of the pipe is less than a thickness of the tubular wall of the first pipe.

* * * * *